(12) United States Patent
Ueno et al.

(10) Patent No.: US 10,075,580 B2
(45) Date of Patent: Sep. 11, 2018

(54) MOBILE ELECTRONIC DEVICE, DISPLAY CONTROL METHOD, AND NON-TRANSITORY STORAGE MEDIUM

(71) Applicant: KYOCERA Corporation, Kyoto-shi, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/115,250

(22) PCT Filed: Oct. 28, 2014

(86) PCT No.: PCT/JP2014/078645
§ 371 (c)(1),
(2) Date: Jul. 28, 2016

(87) PCT Pub. No.: WO2015/114898
PCT Pub. Date: Aug. 6, 2015

(65) Prior Publication Data
US 2017/0019523 A1    Jan. 19, 2017

(30) Foreign Application Priority Data

Jan. 30, 2014 (JP) .................. 2014-015519

(51) Int. Cl.
*H04M 1/725* (2006.01)
*G01P 15/00* (2006.01)
*G01C 19/00* (2013.01)

(52) U.S. Cl.
CPC ........ *H04M 1/72569* (2013.01); *G01C 19/00* (2013.01); *G01P 15/00* (2013.01);
(Continued)

(58) Field of Classification Search
None
See application file for complete search history.

(56) References Cited

U.S. PATENT DOCUMENTS

2009/0164115 A1* 6/2009 Kosakowski ...... G01C 21/3641
701/533
2011/0050503 A1* 3/2011 Fong .................. G01C 21/26
342/451

(Continued)

FOREIGN PATENT DOCUMENTS

JP    2002-357683 A    12/2002
JP    2011-66850 A      3/2011

(Continued)

OTHER PUBLICATIONS

International Search Report in PCT/JP2014/078645, dated Nov. 25, 2014.

*Primary Examiner* — James Yang
(74) *Attorney, Agent, or Firm* — Hauptman Ham, LLP

(57) ABSTRACT

In one aspect of the present invention, a mobile electronic device determines, when it is in a sleep state, a moving state of the mobile electronic device based on detection results of an acceleration sensor, a direction sensor, and a gyroscope. For example, the mobile electronic device determines whether a user is moving in a train, is moving on foot, or is moving in a car. The mobile electronic device displays information corresponding to the moving state (for example, in a train or a car, or on foot) on the display when returning from the sleep state to light up the display again.

15 Claims, 10 Drawing Sheets

(52) U.S. Cl.
CPC ... *H04M 1/72566* (2013.01); *H04M 1/72572* (2013.01); *H04M 1/72583* (2013.01); H04M 2250/22 (2013.01)

(56) References Cited

U.S. PATENT DOCUMENTS

| | | |
|---|---|---|
| 2011/0072361 A1 | 3/2011 | Sakai et al. |
| 2013/0246949 A1* | 9/2013 | Kikuchi ................ G06F 3/0484 715/765 |
| 2014/0031068 A1* | 1/2014 | Yamada ................ G06Q 30/02 455/456.3 |
| 2014/0139454 A1* | 5/2014 | Mistry .................... G06F 3/041 345/173 |

FOREIGN PATENT DOCUMENTS

| | | |
|---|---|---|
| JP | 2012-221207 A | 11/2012 |
| JP | 2013-196169 A | 9/2013 |

* cited by examiner

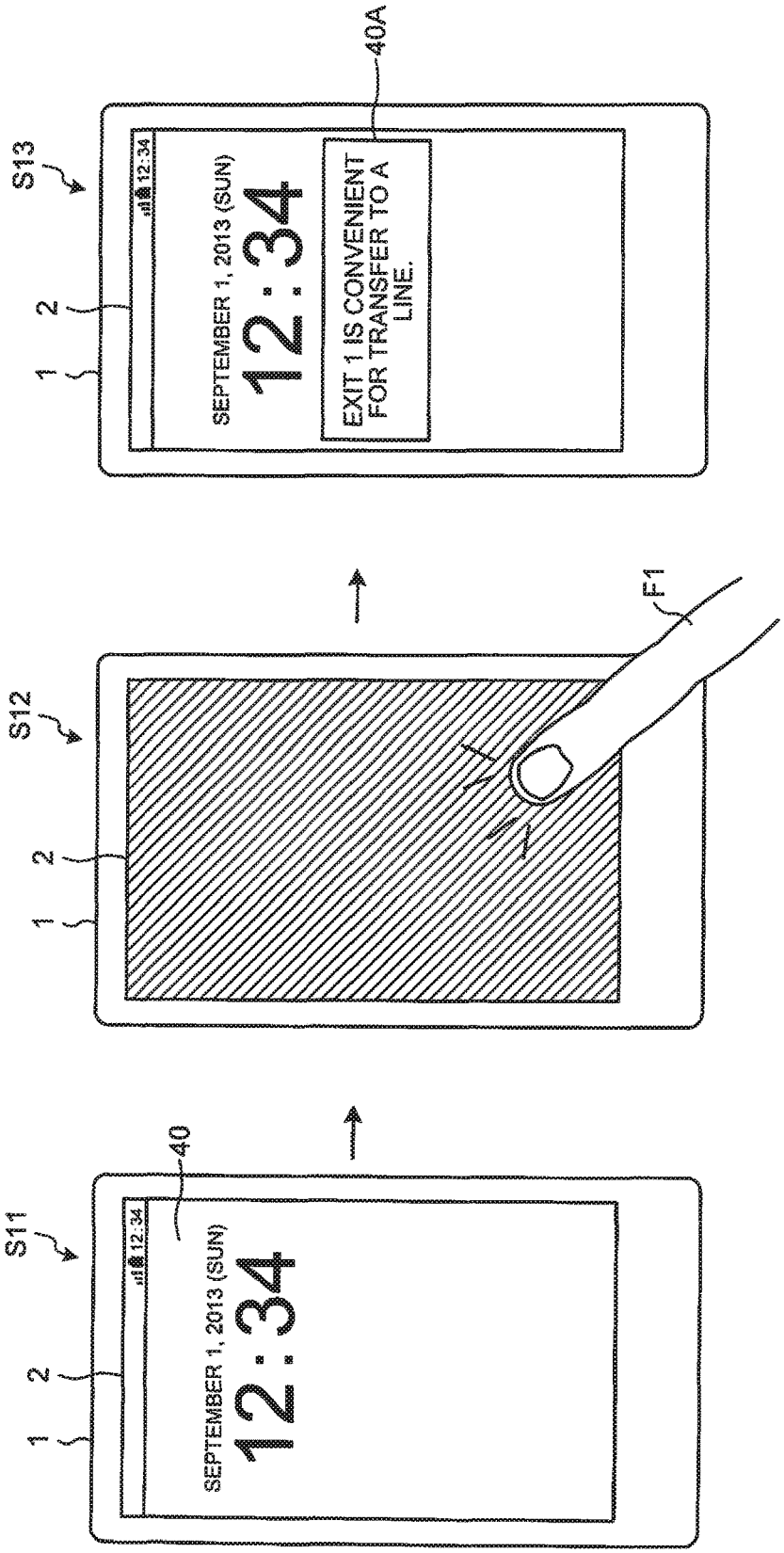

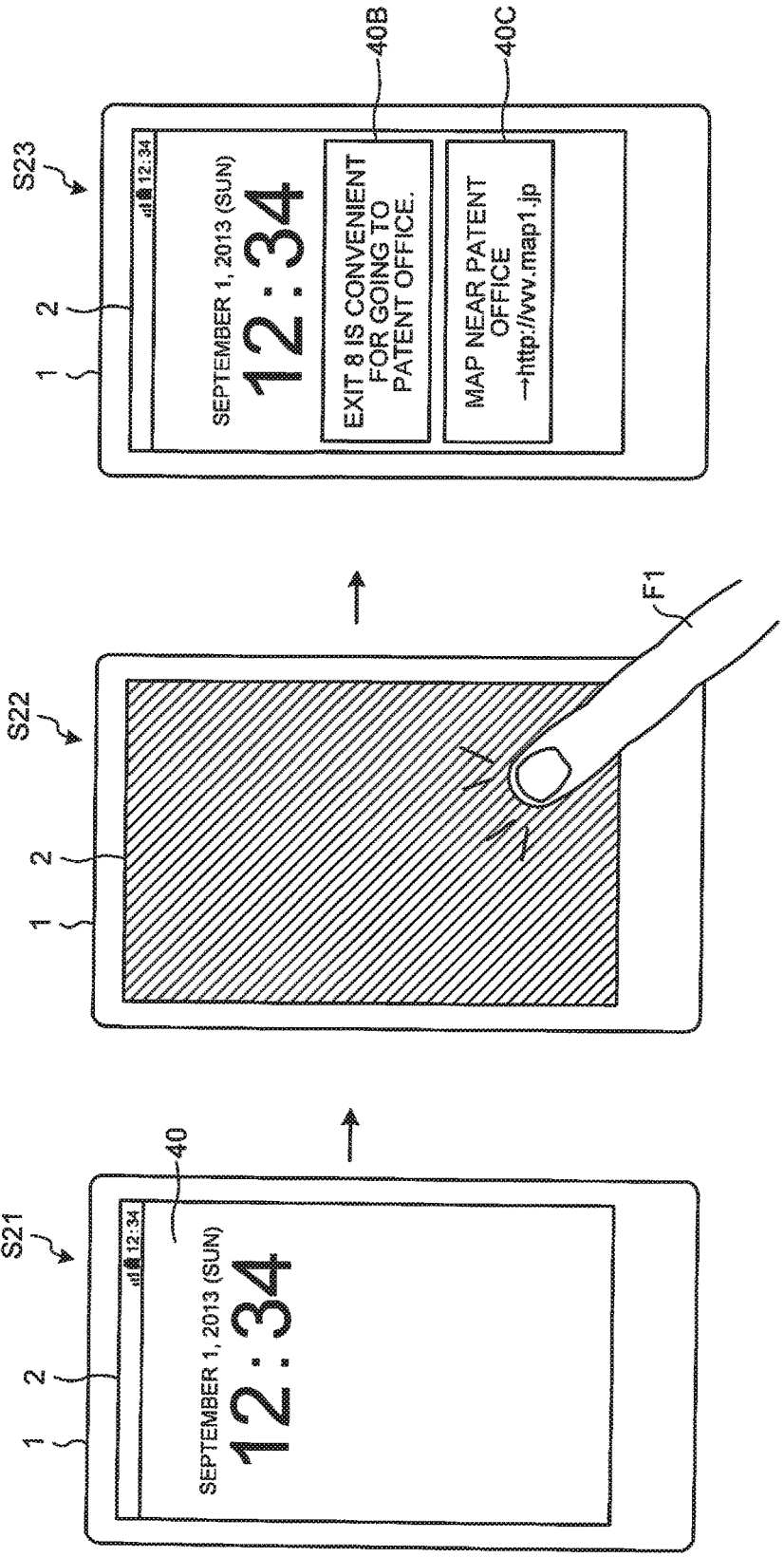

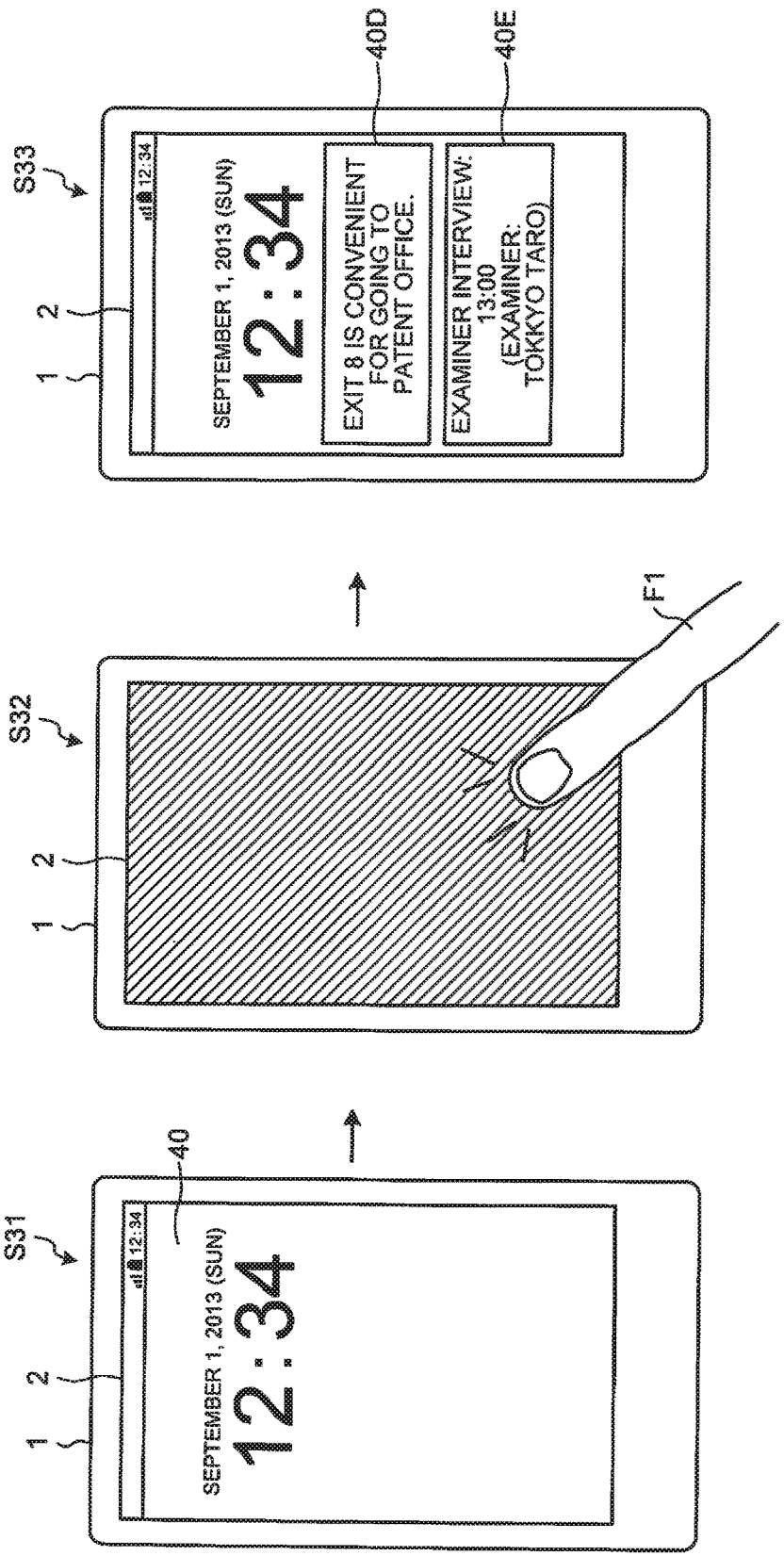

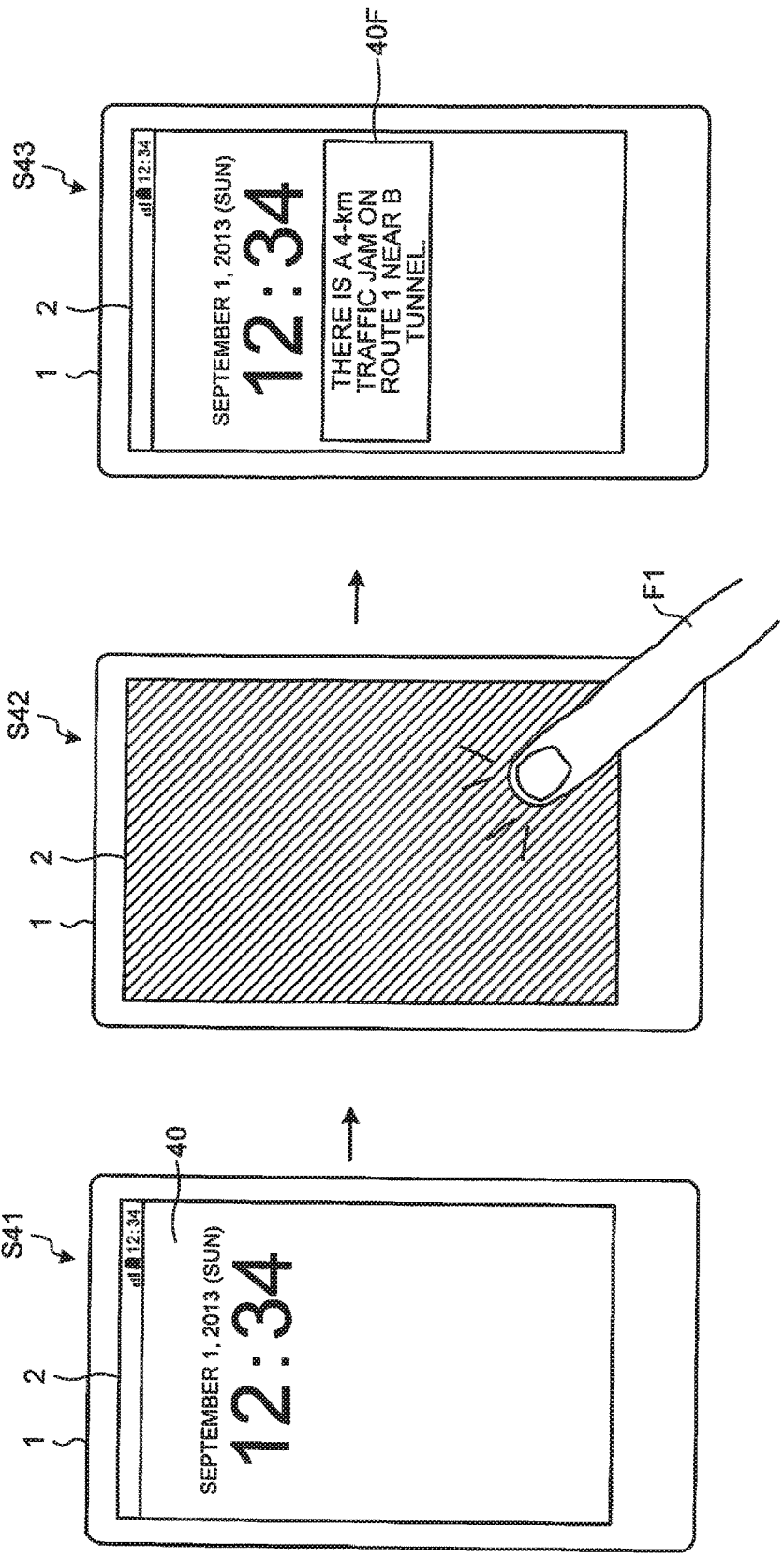

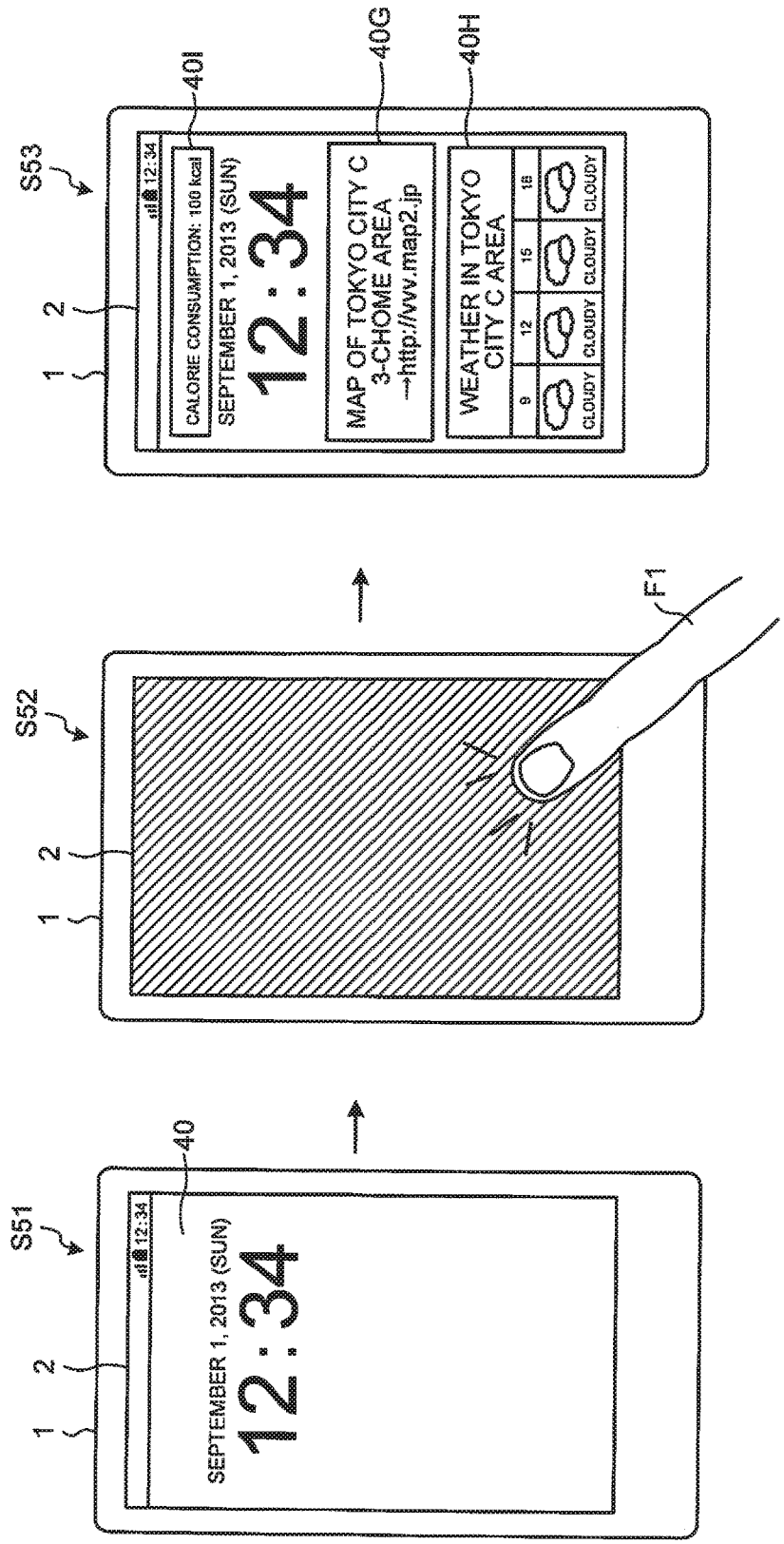

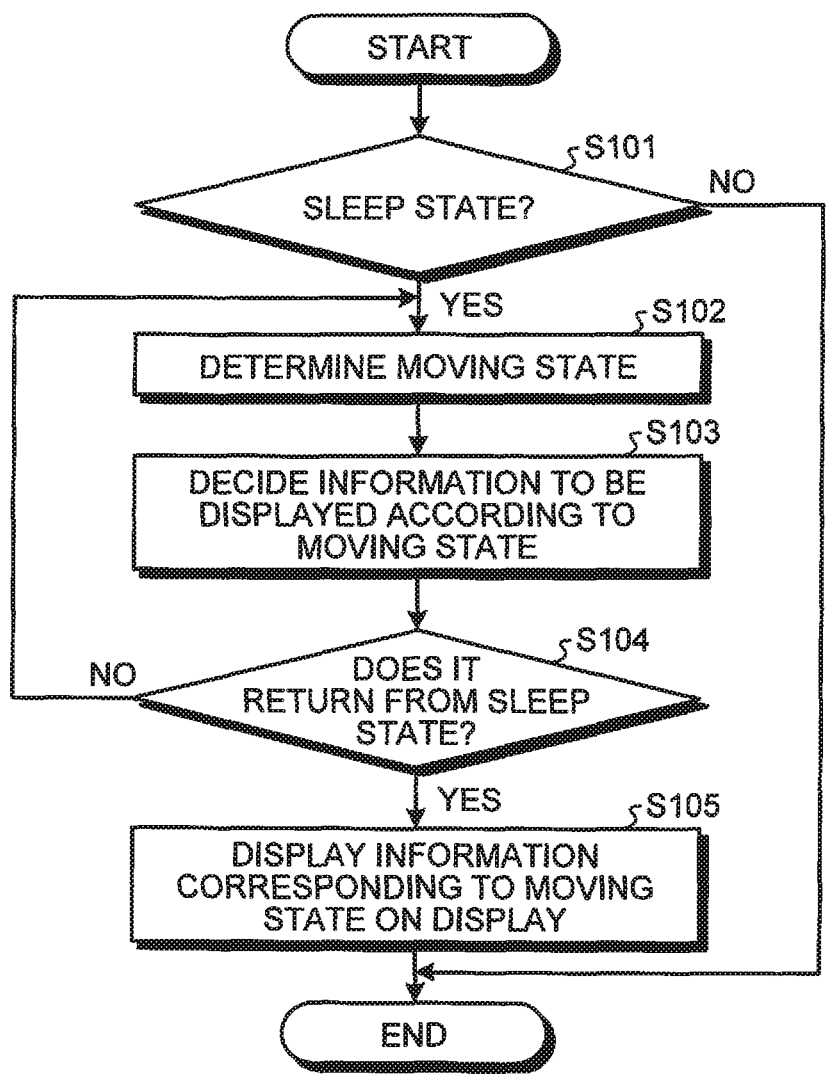

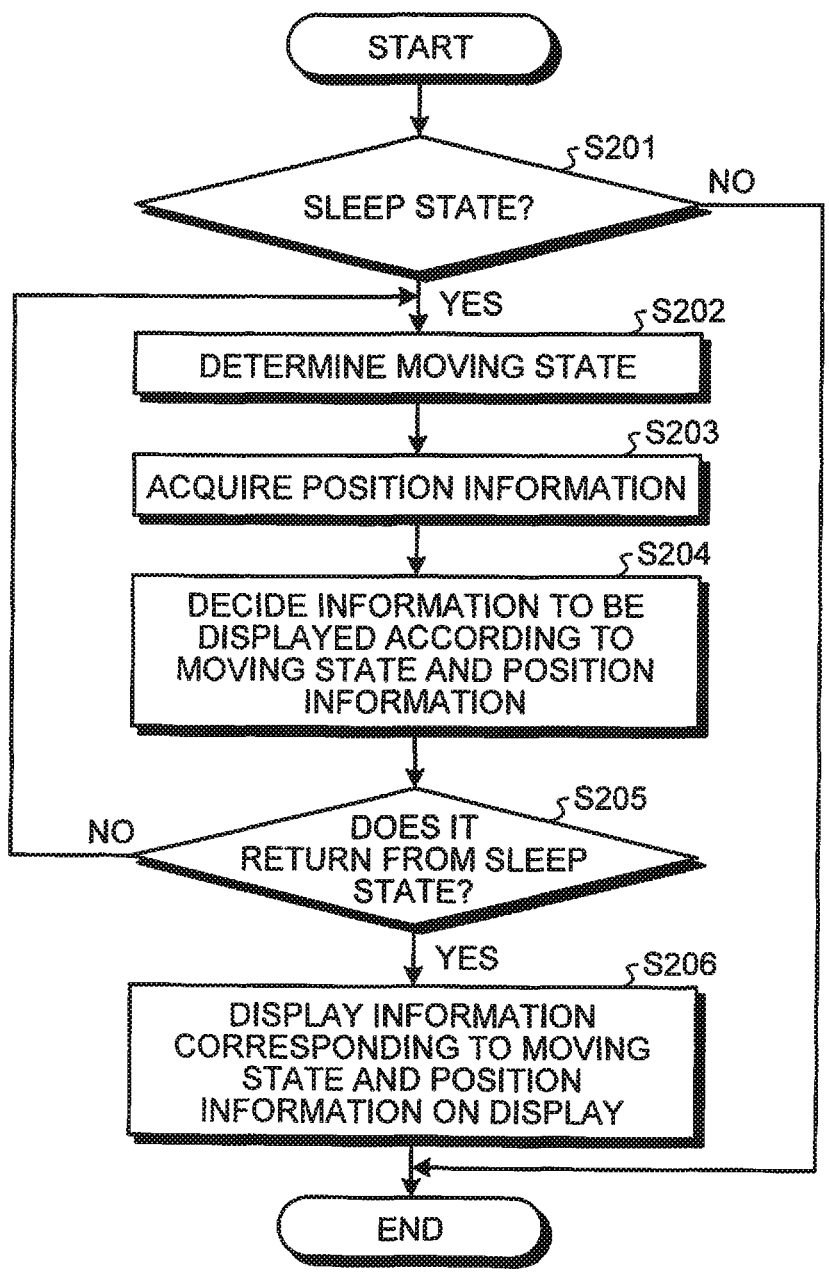

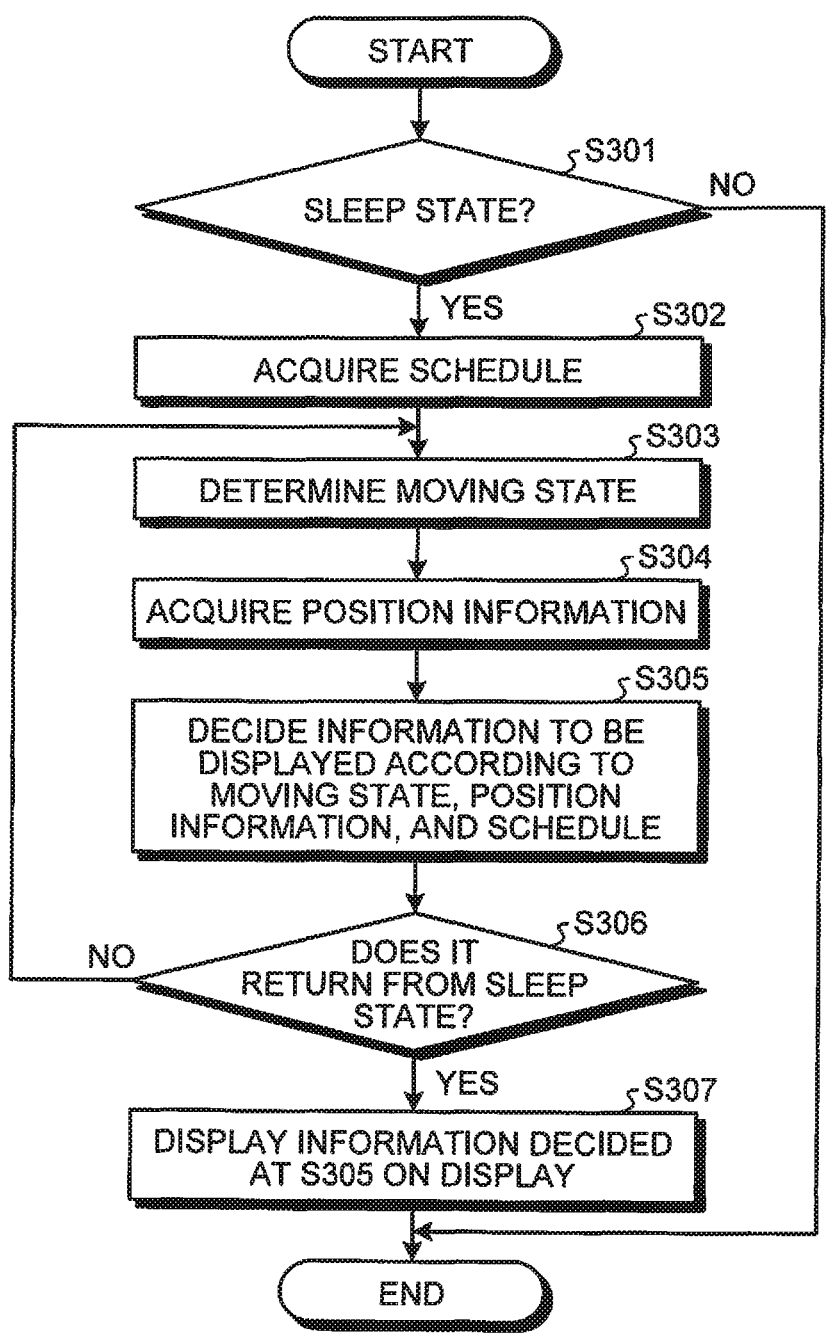

MOBILE ELECTRONIC DEVICE, DISPLAY CONTROL METHOD, AND NON-TRANSITORY STORAGE MEDIUM

CROSS-REFERENCE TO RELATED APPLICATION

This application is a National Stage of PCT international application Ser. No. PCT/JP2014/078645 filed on Oct. 28, 2014 which designates the United States, incorporated herein by reference, and which is based upon and claims the benefit of priority from Japanese Patent Application No. 2014-015519 filed on Jan. 30, 2014, the entire contents of which are incorporated herein by reference.

FIELD

The present application relates to a mobile electronic device, a display control method, and a storage medium.

BACKGROUND

Conventionally, some mobile electronic devices such as mobile phones and smartphones include those for controlling, when not in use, turn-off of a backlight which makes a display light up.

SUMMARY

Technical Problem

Incidentally, when receiving a predetermined operation, the mobile electronic device makes a display in an off state light up again using a backlight. At that time, there is a situation in which a predetermined screen such as a home screen is always displayed on the display.

Solution to Problem

According to embodiments, there is provided a mobile electronic device comprising: a display configured to display information; and a controller configured to determine a moving state, wherein the controller is configured to decide information to be displayed when the display is lit up based on the moving state.

According to embodiments, there is provided a display control method executed by a mobile electronic device having a display, the display control method comprising: a step of determining a moving state; and a step of changing information to be displayed when the display is lit up based on the moving state.

According to embodiments, there is provided a non-transitory storage medium having a display control program for causing a mobile electronic device having a display to execute: a step of determining a moving state; and a step of changing information to be displayed when the display is lit up based on the moving state.

BRIEF DESCRIPTION OF DRAWINGS

FIG. 3 is a diagram illustrating an example of display control of information when the smartphone determines that a moving state is movement by train.

FIG. 4 is a diagram illustrating another example of the display control of information when the smartphone determines that the moving state is movement by train.

FIG. 5 is a diagram illustrating another example of the display control of information when the smartphone determines that the moving state is movement by train.

FIG. 6 is a diagram illustrating an example of display control of information when the smartphone determines that the moving state is movement by car.

FIG. 7 is a diagram illustrating an example of display control of information when the smartphone determines that the moving state is movement on foot.

FIG. 8 is a flowchart illustrating a flow of processing performed by the smartphone according to the embodiments.

FIG. 9 is a flowchart illustrating a flow of processing performed by the smartphone according to the embodiments.

FIG. 10 is a flowchart illustrating a flow of processing performed by the smartphone according to the embodiments.

DESCRIPTION OF EMBODIMENTS

A plurality of embodiments for implementing a mobile electronic device, a display control method, and a display control program that a storage medium has according to the present application will be explained in detail below with reference to the accompanying drawings. A smartphone will be explained below as an example of the mobile electronic device.

Embodiments

Figure 1:
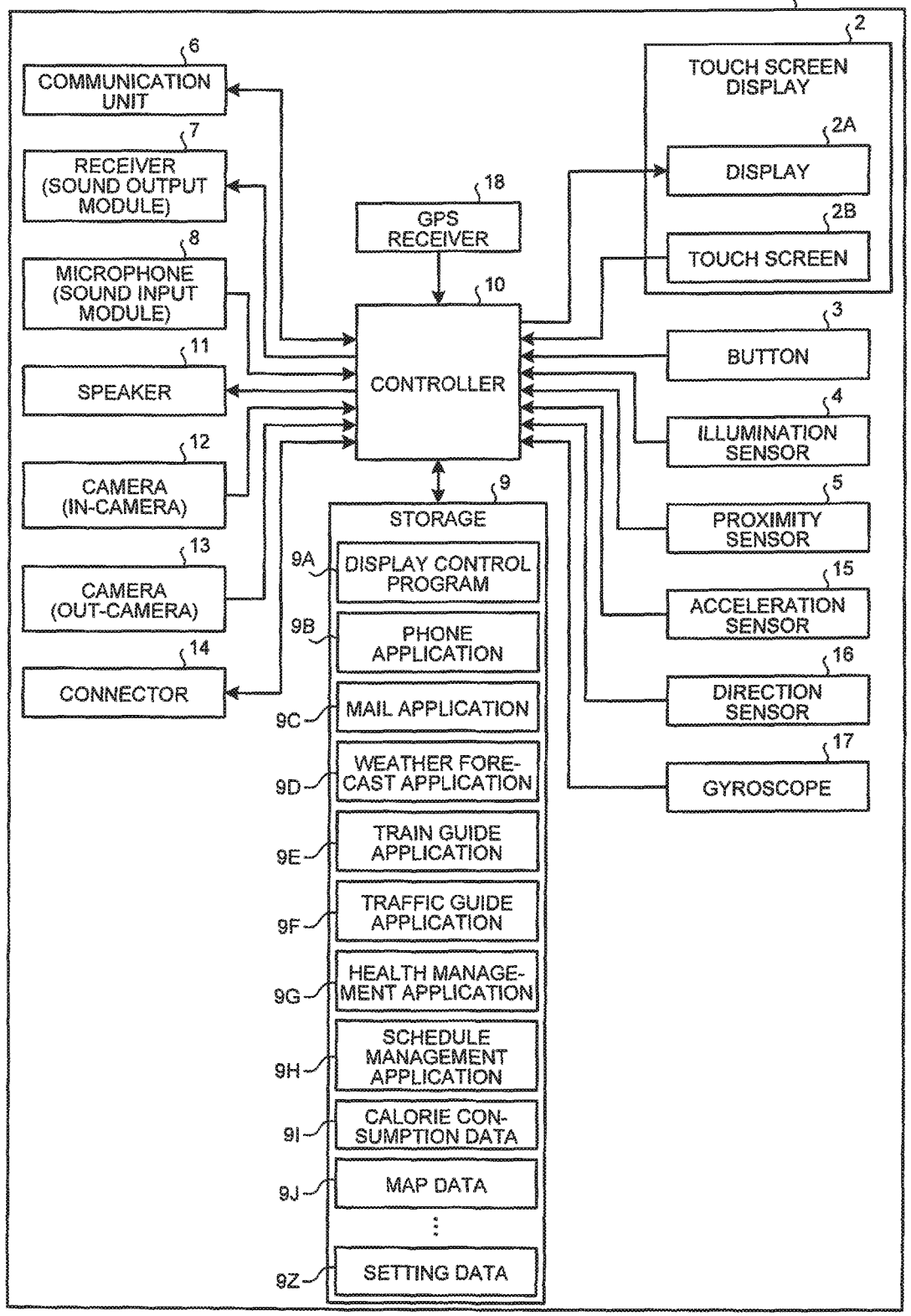
FIG. 1 is a block diagram illustrating a functional configuration of a smartphone according to an example of embodiments.

A functional configuration of a smartphone 1 according to an example of the embodiments will be explained below. FIG. 1 is a block diagram illustrating the functional configuration of the smartphone according to an example of the embodiments. In the description herein below, the same reference signs may be assigned to the same components. Moreover, an overlapping description may be omitted.

As illustrated in FIG. 1, the smartphone 1 includes a touch screen display 2, a button 3, an illumination sensor 4, a proximity sensor 5, a communication unit 6, a receiver 7, a microphone 8, a storage 9, a controller 10, a speaker 11, a camera 12, a camera 13, a connector 14, an acceleration sensor 15, a direction sensor 16, a gyroscope 17, and a GPS receiver 18.

The touch screen display 2 includes a display 2A and a touch screen 2B. The display 2A and the touch screen 2B may be arranged in a superimposed manner, or may be arranged side by side, or may be arranged apart from each other. When the display 2A and the touch screen 2B are arranged in the superimposed manner, for example, one or more sides of the display 2A do not have to be along any of the sides of the touch screen 2B.

The display 2A includes a display device such as an LCD (Liquid Crystal Display), an OELD (Organic Electro-Luminescence Display), or an IELD (Inorganic Electro-Luminescence Display). The display 2A displays texts, images, symbols, graphics, and the like. A screen including the texts, images, symbols, graphics, and the like displayed by the display 2A includes a screen called a lock screen, a screen called a home screen, and an application screen appearing during running of an application. The home screen is sometimes called a desktop, a standby screen, an idle screen, a standard screen, an application list screen, or a launcher screen.

In the embodiments, the display 2A displays information based on a moving state of the smartphone 1 (moving state of a user carrying the smartphone 1).

The touch screen 2B detects a contact of a finger, a pen, or a stylus pen, etc. with the touch screen 2B. The touch screen 2B can detect positions where a plurality of fingers, pens, or stylus pens etc. (hereinafter, simply called "finger(s)") make contact with the touch screen 2B. The touch screen 2B notifies the controller 10 of the contact of the finger with the touch screen 2B (touch screen display 2) along with the position of the location on the touch screen display 2 where it is contacted. In the embodiments, the touch screen 2B notifies the controller 10 of the contact of the finger with a character entry screen displayed on the display 2A and the position thereof on the character entry screen.

The detection method of the touch screen 2B may be any detection method of a capacitive type detection method, a resistive type detection method, a surface acoustic wave type (or ultrasonic type) detection method, an infrared type detection method, an electromagnetic induction type detection method, and a load sensing type detection method. In the description herein below, for the sake of simplicity, it is assumed that the user uses his/her finger(s) to make contact with the touch screen 2B in order to operate the smartphone 1.

The controller 10 (smartphone 1) determines a type of gestures based on at least one of a contact detected by the touch screen 2B, a position where the contact is detected, a change of the position where the contact is detected, an interval between detected contacts, and the number of detection times of the contacts. The gesture is an operation performed on the touch screen 2B (touch screen display 2) using the finger(s). Examples of the gestures determined by the controller 10 (smartphone 1) through the touch screen 2B include, but are not limited to, touch, long touch, release, swipe, tap, double tap, long tap, drag, flick, pinch in, and pinch out.

The button 3 receives an input of user operation. The number of buttons 3 may be single or plural.

The illumination sensor 4 detects illumination of the ambient light of the smartphone 1. The illumination indicates intensity, lightness, or luminance of light. The illumination sensor 4 is used, for example, to adjust the luminance of the display 2A.

The proximity sensor 5 detects the presence of nearby objects in a non-contact manner. The proximity sensor 5 detects the presence of the object based on a change in the magnetic field or a change in the return time of the reflected ultrasonic wave, etc. The proximity sensor 5 detects that, for example, the display 2A is brought close to someone's face. The illumination sensor 4 and the proximity sensor 5 may be configured as one sensor. The illumination sensor 4 can be used as the proximity sensor.

The communication unit 6 performs wireless communication. A wireless communication standard supported by the communication unit 6 includes, for example, a cellular-phone communication standard such as 2G, 3G, and 4G, and a short-distance wireless communication standard. The cellular-phone communication standard includes, for example, LTE (Long Term Evolution), W-CDMA (Wideband Code Division Multiple Access), WiMAX (Worldwide Interoperability for Microwave Access), CDMA 2000, PDC (Personal Digital Cellular), GSM (registered trademark) (Global System for Mobile Communications), and PHS (Personal Handy-phone System). The short-distance wireless communication standard includes, for example, IEEE 802.11, Bluetooth (registered trademark), IrDA (Infrared Data Association), NFC (Near Field Communication), and WPAN (Wireless Personal Area Network). A WPAN communication standard includes, for example, ZigBee (registered trademark). The communication unit 6 may support one or more of the communication standards.

The receiver 7 is a sound output unit. The receiver 7 outputs a sound signal transmitted from the controller 10 as sound. The receiver 7 is used, for example, to output the voice of the other party on the phone. The microphone 8 is a sound input unit. The microphone 8 converts the voice of the user or the like to a sound signal and transmits the sound signal to the controller 10.

The storage 9 stores programs and data. The storage 9 is used also as a work area that temporarily stores a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disc, or a magneto-optical disc with a reading device of the storage medium. The storage 9 may include a storage device used as a temporary storage area such as RAM (Random Access Memory).

Programs stored in the storage 9 include applications executed in the foreground or the background and a control program for assisting operations of the applications. For example, a screen for the application executed in the foreground is displayed on the display 2A. The control program includes, for example, an OS. The applications and the control program may be installed in the storage 9 through wireless communication by the communication unit 6 or through a non-transitory storage medium.

The storage 9 stores, for example, a display control program 9A, a phone application 9B, a mail application 9C, a weather forecast application 9D, a train guide application 9E, a traffic guide application 9F, a health management application 9G, a schedule management application 9H, calorie consumption data 9I, map data 9J, and setting data 9Z.

The display control program 9A provides a function related to various types of control of the smartphone 1. For example, the display control program 9A provides a function for determining a moving state of the smartphone 1. For example, the display control program 9A provides a function for deciding information to be displayed when the display 2A is lit up based on the moving state. For example, the display control program 9A provides a function for deciding information to be displayed when the display 2A is lit up based on the moving state and the position information. For example, the display control program 9A provides a function for deciding information to be displayed when the display 2A is lit up based on the transition of the moving state.

The phone application 9B provides a phone call function for phone calls through wireless communication. The mail application 9C provides an email function for composition, transmission, reception, display, and the like of emails. The weather forecast application 9D provides a function for providing various types of information related to weather. The train guide application 9E provides a function for providing various types of information related to changing of trains or the like. The traffic guide application 9F provides a function for providing road traffic information related to traffic conditions of roads such as traffic jams and accidents. The health management application 9G provides a function for providing various types of information related to health such as calorie consumption. The health management application 9G calculates, for example, calorie consumption after the execution of the health management application is started by the user. The schedule management application 9H provides a function for providing various types of information related to schedule. The applications stored in the storage 9 are only examples. In addition to the applications illustrated in FIG. 1, a memo application, a browser application, a navigate application, a music player application, a moving image reproduction application, a calculator application, a tag application, and the like may be stored therein.

The calorie consumption data 9I is data of calorie consumption of the user calculated by the function provided by the health management application 9G. The map data 9J is an address on the Internet such as URL (Uniform Resource Locator) of the database where the map data is managed.

The setting data 9Z includes information on various settings related to the operations of the smartphone 1. In the embodiments explained below, for example, the setting data 9Z includes setting information indicating what kind of information should be displayed when the display 2A is lit up again, according to the moving state. For example, when the moving state is movement by train, the setting information includes displaying information for changing trains from the nearest station provided by the train guide application 9E. For example, when the moving state is movement by car, the setting information includes displaying the road traffic information provided by the traffic guide application 9F. For example, when the moving state is movement on foot, the setting information includes displaying address (e.g., URL) for displaying a map near the current location of the user acquired from the map data 9J, weather information for the current location area of the user provided by the weather forecast application 9D, and calorie consumption of the user up to the current time acquired from the calorie consumption data 9I. For example, when the moving state indicates movement by train, the setting information includes displaying optimal information in consideration of the schedule (events) managed by the schedule management application 9H. The setting information indicating what kinds of information should be displayed when the display 2A is lit up again is arbitrarily changeable, and the above content is only an example.

The controller 10 is a processor. Examples of the processor include, but are not limited to, a CPU (Central Processing Unit), an SoC (System-on-a-chip), an MCU (Micro Control Unit), an FPGA (Field-Programmable Gate Array), and a coprocessor. The controller 10 integrally controls the operations of the smartphone 1 to implement various functions. The controller 10 is an example of a control module.

Specifically, the controller 10 executes instructions included in the program stored in the storage 9 while referring to data stored in the storage 9 as necessary. The controller 10 then controls function modules according to the data and the instructions to thereby implement the various functions. Examples of the function modules include, but are not limited to, the display 2A, the communication unit 6, the microphone 8, the speaker 11, and the GPS receiver 18. The controller 10 can change the control according to a detection result of a detector. Examples of the detector include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes the display control program 9A, and thereby performs, for example, the processing for determining the moving state of the smartphone 1. The controller 10 executes the display control program 9A, and thereby performs, for example, the processing for deciding information to be displayed when the display 2A is lit up based on the moving state. The controller 10 executes the display control program 9A, and thereby performs, for example, the processing for deciding information to be displayed when the display 2A is lit up based on the moving state and the position information. The controller 10 executes the display control program 9A, and thereby performs, for example, the processing for deciding information to be displayed when the display 2A is lit up based on the transition of the moving state.

The speaker 11 is a sound output unit. The speaker 11 outputs a sound signal transmitted from the controller 10 as sound. The speaker 11 is used to output, for example, a ring tone and music. Either one of the receiver 7 and the speaker 11 may have the other function.

The camera 12 and the camera 13 convert a captured image to an electric signal. The camera 12 is an in-camera for capturing an object facing the display 2A. The camera 13 is an out-camera for capturing an object facing the opposite side of the display 2A. The camera 12 and the camera 13 may be mounted on the smartphone 1 in a state in which both of them are functionally and physically integrated as a camera unit that can be used by switching between the in-camera and the out-camera.

The connector 14 is a terminal to which other device is connected. The connector 14 may be a general-purpose terminal such as a USB (Universal Serial Bus), an HDMI (registered trademark) (High-Definition Multimedia Interface), Light Peak (Thunderbolt (registered trademark)), and an earphone/microphone connector. The connector 14 may be a dedicated terminal such as a dock connector. Examples of the devices connected to the connector 14 include, but are not limited to, an external storage, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude. The acceleration sensor 15, the direction sensor 16, and the gyroscope 17 may be mounted on the smartphone 1 as an attitude detection unit in which these sensors are functionally and physically integrated.

The GPS receiver 18 receives a radio signal of a predetermined frequency band from a GPS satellite, performs demodulation processing on the received radio signal, and transmits the processed signal to the controller 10.

The smartphone 1 may provide a vibrator in addition to the function modules. The vibrator vibrates part or whole of the smartphone 1. The vibrator includes, for example, a piezoelectric element or an eccentric motor in order to generate vibration. The vibration generated by the vibrator is used to notify the user of various events such as incoming calls. Although not illustrated in FIG. 1, function modules, such as a battery, which should be used to maintain the functions of the smartphone 1 are mounted on the smartphone 1.

An example of the control performed by the smartphone 1 according to the embodiments will be explained below with reference to FIG. 2 to FIG. 7. The examples illustrated in FIG. 3 to FIG. 7 represent states in which the user double taps the touch screen display 2, which blacks out, with his/her finger F1.

Figure 2:
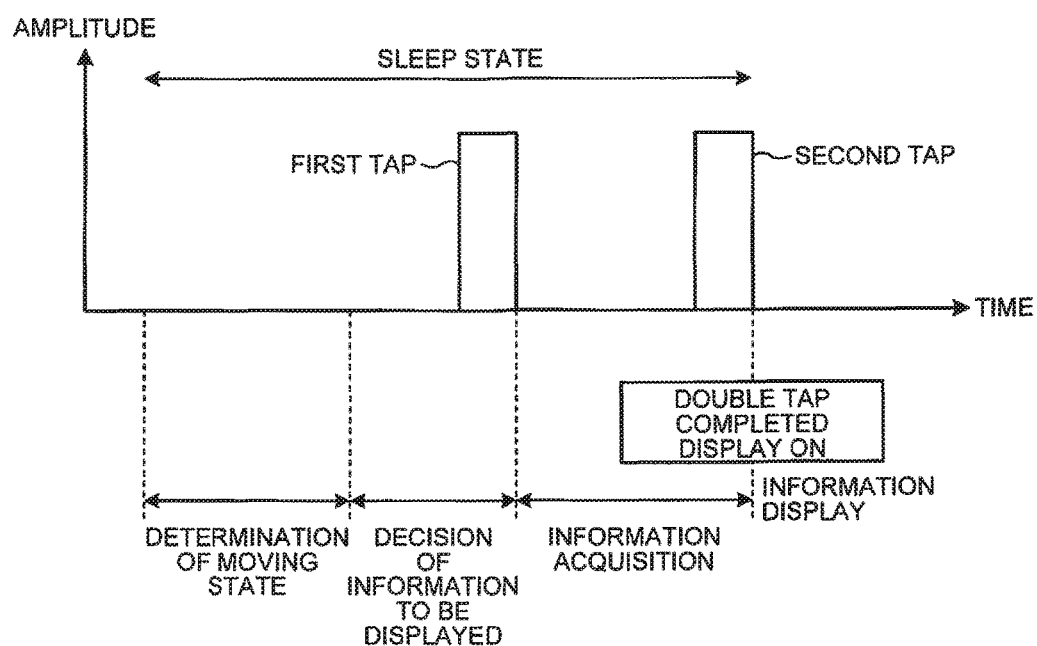
FIG. 2 is a diagram for explaining control performed by the smartphone.

FIG. 2 is a diagram for explaining the control performed by the smartphone 1. As illustrated in FIG. 2, when it is in a sleep state, the smartphone 1 determines the moving state of the smartphone 1 based on the detection results of the acceleration sensor 15, the direction sensor 16, and the gyroscope 17. For example, the smartphone 1 determines whether the user is moving in a train, is moving on foot, or is moving in a car. Subsequently, the smartphone 1 decides the information to be displayed on the display 2A based on the moving state of the smartphone 1 until a first tap is detected via the touch screen 2B. Subsequently, the smartphone 1 acquires the information to be displayed on the display 2A until a second tap is detected via the touch screen 2B. Then, when the second tap is detected, in other words, when the completion of the double tap is detected, the smartphone 1 displays the information corresponding to the moving state on the display 2A when returning from the sleep state to light up the display 2A again.

In the example illustrated in FIG. 2, when the second tap is not detected after the detection of the first tap (when the completion of the double tap is not detected), the smartphone 1 cancels the content determined by the time of detection of the first tap, deletes the acquired information according to the content determined, and performs determination of the moving state of the smartphone 1 once again. Thereby, the information to be displayed on the display 2A is changed according to the latest moving state (transition of the moving state). When the completion of the double tap is not detected, the smartphone 1 may be configured to hold the content determined and the information acquired by the time of detection of the first tap for a give period of time, and to wait for detection of a double tap.

FIG. 3 is a diagram illustrating an example of display control of information when the smartphone determines that the moving state is movement by train. The smartphone 1 makes the operation state of the smartphone 1 transition to the sleep state in association with establishment of a predetermined condition, and turns off the touch screen display 2 (display 2A) (Step S11 to Step S12). In association with the transition to the sleep state, a home screen 40 appearing on the touch screen display 2 (display 2A) blacks out.

Triggered by the transition to the sleep state, the smartphone 1 starts to determine the moving state. Subsequently, when it is determined that the moving state is the movement by train until a first tap is detected via the touch screen display 2 (touch screen 2B), the smartphone 1 decides the information corresponding to the movement by train as information to be displayed on the touch screen display 2 (display 2A). For example, when the moving state is the movement by train, the smartphone 1 decides the information for changing trains from the nearest station provided by the train guide application 9E as information to be displayed.

Then, the smartphone 1 specifies the route of the train the user is on and the current nearest station based on the position information acquired from the GPS receiver 18 until a second tap is detected, and acquires the information for changing trains from the nearest station based on the information provided by the train guide application 9E.

When detecting a double tap (Step S12), the smartphone 1 displays information 40A as the information for changing trains, which has not been displayed on the home screen 40 before becoming the sleep state, when returning from the sleep state to light up the touch screen display 2 (display 2A) again (Step S13).

The example illustrated in FIG. 3 has explained the case where the route of the train the user is on and the current nearest station are specified according to the position information and the information for changing trains from the nearest station is displayed, however, the embodiments are not limited thereto. For example, when it is determined that the moving state is the movement by train without specifying the route and the nearest station based on the position information, it may be configured to display information simply for each route (delay, stop) or the like as information corresponding to the moving state in a train.

FIG. 4 is a diagram illustrating another example of the display control of information when the smartphone 1 determines that the moving state is movement by train. In the example illustrated in FIG. 4, it is assumed that a meeting scheduled at the Patent Office at 13 pm is recorded as an event by the schedule management application 9H.

The smartphone 1 makes the operation state of the smartphone 1 transition to the sleep state in association with the establishment of the predetermined condition, and turns off the touch screen display 2 (display 2A) (Step S21 to Step S22). In association with the transition to the sleep state, the home screen 40 appearing on the touch screen display 2 (display 2A) blacks out.

Triggered by the transition to the sleep state, the smartphone 1 starts to determine the moving state. Subsequently, when it is determined that the moving state is the movement by train until a first tap is detected via the touch screen display 2 (touch screen 2B), the smartphone 1 decides the information corresponding to the movement by train as information to be displayed on the touch screen display 2 (display 2A). When the information corresponding to the movement by train is to be decided, the smartphone 1 selects information estimated as optimal in consideration of an event when the event recorded in the schedule management application 9H satisfies the predetermined condition. For example, the smartphone 1 determines that the event satisfies the predetermined condition if a set time of the event is within a given time (e.g., within 30 min.) from the current time, and selects the information estimated as optimal in consideration of the event.

Then, the smartphone 1 specifies the route of the train the user is on and the current nearest station based on the position information acquired from the GPS receiver 18 until a second tap is detected. When it is determined that the set time (e.g., 13 pm) of the event recorded in the schedule management application 9H is within the given time from the current time, the smartphone 1 acquires an exit guide to the Patent Office at the nearest station from the train guide application 9E, and acquires URL for acquiring a map near the Patent Office from the map data 9J.

When detecting a double tap (Step S22), the smartphone 1 displays an exit guide 40B to the Patent Office and information 40C for displaying a map near the Patent Office, which have not been displayed on the home screen 40 before becoming the sleep state, on the touch screen display 2 (display 2A) when returning from the sleep state to light up the touch screen display 2 (display 2A) again (Step S23).

FIG. 5 is a diagram illustrating another example of the display control of information when the smartphone 1 determines that the moving state is movement by train. In the example illustrated in FIG. 5, it is assumed that Examiner Interview scheduled at the Patent Office at 13 pm (and examiner name) is recorded as an event by the schedule management application 9H.

The smartphone 1 makes the operation state of the smartphone 1 transition to the sleep state in association with the establishment of the predetermined condition, and turns off the touch screen display 2 (display 2A) (Step S31 to Step S32). In association with the transition to the sleep state, the home screen 40 appearing on the touch screen display 2 (display 2A) blacks out.

Triggered by the transition to the sleep state, the smartphone 1 starts to determine the moving state. Subsequently, when it is determined that the moving state is the movement by train until a first tap is detected via the touch screen display 2 (touch screen 2B), the smartphone 1 decides the information corresponding to the movement by train as information to be displayed on the touch screen display 2 (display 2A). When the information corresponding to the movement by train is to be decided, the smartphone 1 selects information estimated as optimal in consideration of an event when the event recorded in the schedule management application 9H satisfies the predetermined condition. For example, the smartphone 1 determines that the event satisfies the predetermined condition if a set time of the event is within a given time (e.g., within 30 min.) from the current time, and selects the information estimated as optimal in consideration of the event.

Then, the smartphone 1 specifies the route of the train the user is on and the current nearest station based on the position information acquired from the GPS receiver 18 until a second tap is detected. When it is determined that the set time (e.g., 13 pm) of the event recorded in the schedule management application 9H is within the given time from the current time, the smartphone 1 acquires an exit guide to the Patent Office at the nearest station from the train guide application 9E, and acquires the event information (e.g., "Examiner Interview: 13 pm. (Examiner: Tokkyo Taro)") recorded in the schedule management application 9H.

When detecting a double tap (Step S32), the smartphone 1 displays an exit guide 40D to the Patent Office and event information 40E (e.g., "Examiner Interview: 13 pm. (Examiner: Tokkyo Taro)"), which have not been displayed on the home screen 40 before becoming the sleep state, on the touch screen display 2 (display 2A) when returning from the sleep state to light up the touch screen display 2 (display 2A) again (Step S33).

FIG. 6 is a diagram illustrating an example of display control of information when the smartphone 1 determines that the moving state is movement by car. The smartphone 1 makes the operation state of the smartphone 1 transition to the sleep state in association with the establishment of the predetermined condition, and turns off the touch screen display 2 (display 2A) (Step S41 to Step S42). In association with the transition to the sleep state, the home screen 40 appearing on the touch screen display 2 (display 2A) blacks out.

Triggered by the transition to the sleep state, the smartphone 1 starts to determine the moving state. Subsequently, when it is determined that the moving state is movement by car until a first tap is detected via the touch screen display 2 (touch screen 2B), the smartphone 1 decides the information corresponding to the movement by car as information to be displayed on the touch screen display 2 (display 2A). For example, when the moving state is the movement by car, the smartphone 1 decides the road traffic information provided by the traffic guide application 9F as information to be displayed.

Then, the smartphone 1 specifies the road where the car the user is in is running based on the position information acquired from the GPS receiver 18 until a second tap is detected, and acquires the road traffic information corresponding to the specified road from the road traffic information provided by the traffic guide application 9F.

Subsequently, when detecting a double tap (Step S42), the smartphone 1 displays road traffic information 40F, which has not been displayed on the home screen 40 before becoming the sleep state, when returning from the sleep state to light up the touch screen display 2 (display 2A) again (Step S43).

The example illustrated in FIG. 6 has explained the case where the road where the car the user is in is running is specified according to the position information and the road traffic information corresponding to the specified road is displayed, however, the embodiments are not limited thereto. For example, when it is determined that the moving state is the movement by car without specifying the road based on the position information, it may be configured to display information simply for each road (accidents, traffic jams) or the like as information corresponding to the moving state in the car.

FIG. 7 is a diagram illustrating an example of display control of information when the smartphone 1 determines that the moving state is movement on foot. The smartphone 1 makes the operation state of the smartphone 1 transition to the sleep state in association with the establishment of the predetermined condition, and turns off the touch screen display 2 (display 2A) (Step S51 to Step S52). In association with the transition to the sleep state, the home screen 40 appearing on the touch screen display 2 (display 2A) blacks out.

Triggered by the transition to the sleep state, the smartphone 1 starts to determine the moving state. Subsequently, when it is determined that the moving state is the movement on foot until a first tap is detected via the touch screen display 2 (touch screen 2B), the smartphone 1 decides the information corresponding to the movement on foot as information to be displayed on the touch screen display 2 (display 2A). For example, when the moving state is the movement on foot, the smartphone 1 decides URL for displaying a map for the current location area of the user acquired from the map data 9J, weather of the current location area of the user provided by the weather forecast application 9D, and calorie consumption of the user up to the current time acquired from the calorie consumption data 9I as information to be displayed.

Then, the smartphone 1 specifies the current location of the user based on the position information acquired from the GPS receiver 18 until a second tap is detected. Subsequently, based on the specified current location of the user, the smartphone 1 acquires the URL for displaying the map for the current location area of the user from the map data 9J, acquires the weather information for the current location area of the user from the weather forecast application 9D, and acquires the calorie consumption of the user up to the current time acquired from the calorie consumption data 9I.

When detecting a double tap (Step S52), the smartphone 1 displays information 40G for displaying a map for the current location area of the user, weather information 40H for the current location area of the user, and calorie consumption data 40I of the user up to the current time, which have not been displayed on the home screen 40 before becoming the sleep state, when returning from the sleep state to light up the touch screen display 2 (display 2A) again (Step S53).

The example illustrated in FIG. 7 has explained the case where the current location of the user is specified according to the position information and the map for the current location area of the user is displayed based on the specified current location of the user, however, the embodiments are not limited thereto. For example, when it is determined that the moving state is the movement on foot without specifying the current location of the user based on the position information, it may be configured to simply display calorie consumption or the like as information corresponding to the moving state on foot.

A flow of processing performed by the smartphone 1 according to the embodiments will be explained below with reference to FIG. 8 to FIG. 10. FIG. 8 to FIG. 10 are flowcharts each illustrating a flow of processing performed by the smartphone 1 according to the embodiments. The processings illustrated in FIG. 8 to FIG. 10 are implemented by the controller 10 executing the display control program 9A or the like stored in the storage 9.

The processing for deciding information to be displayed according to the moving state will be explained below with reference to FIG. 8. As illustrated in FIG. 8, the controller 10 determines whether it is in a sleep state (Step S101).

When it is in the sleep state as a result of determination (Yes at Step S101), the controller 10 performs determination of the moving state (Step S102). The controller 10 determines the moving state of the smartphone 1 based on the detection results of the acceleration sensor 15, the direction sensor 16, and the gyroscope 17. For example, the smartphone 1 determines whether the user is moving in a train, is moving on foot, or is moving in a car.

Subsequently, the controller 10 decides information to be displayed when returning from the sleep state to light up the display 2A again according to the moving state (Step S103).

Subsequently, the controller 10 determines whether to return from the sleep state (Step S104). For example, the controller 10 determines whether a double tap is detected via the touch screen 2B.

When a double tap is detected as a result of detection to thereby return from the sleep state (Yes at Step S104), the controller 10 displays the information decided at Step S103 (information corresponding to the moving state) on the display 2A when returning from the sleep state to light up the display 2A again (Step S105), and ends the processing illustrated in FIG. 8.

Meanwhile, when it does not return from the sleep state because a double tap is not detected as a result of detection (No at Step S104), the controller 10 returns to the Step S102.

When it is not in the sleep state as a result of determination at the Step S101 (No at Step S101), the controller 10 ends the processing illustrated in FIG. 8.

The processing for deciding information to be displayed according to the moving state and the position information will be explained below with reference to FIG. 9. As illustrated in FIG. 9, the controller 10 determines whether it is in the sleep state (Step S201).

When it is in the sleep state as a result of determination (Yes at Step S201), the controller 10 performs determination of the moving state (Step S202). The controller 10 determines the moving state of the smartphone 1 based on the detection results of the acceleration sensor 15, the direction sensor 16, and the gyroscope 17. For example, the smartphone 1 determines whether the user is moving in a train, is moving on foot, or is moving in a car.

Subsequently, the controller 10 acquires the position information from the GPS receiver 18 (Step S203).

Subsequently, the controller 10 decides information to be displayed when returning from the sleep state to light up the display 2A again according to the moving state and the position information (Step S204).

Subsequently, the controller 10 determines whether to return from the sleep state (Step S205). For example, the controller 10 determines whether a double tap is detected via the touch screen 2B.

When a double tap is detected as a result of detection to return from the sleep state (Yes at Step S205), the controller 10 displays the information decided at Step S204 (information corresponding to the moving state and the position information) on the display 2A when returning from the sleep state to light up the display 2A again (Step S206), and ends the processing illustrated in FIG. 9.

Meanwhile, when it does not return from the sleep state because a double tap is not detected as a result of detection (No at Step S205), the controller 10 returns to the Step S202.

When it is not in the sleep state as a result of determination at the Step S201 (No at Step S201), the controller 10 ends the processing illustrated in FIG. 9.

The processing for deciding information to be displayed according to the moving state and the position information will be explained below with reference to FIG. 10. As illustrated in FIG. 10, the controller 10 determines whether it is in the sleep state (Step S301).

When it is in the sleep state as a result of determination (Yes at Step S301), the controller 10 acquires schedule (event) managed by the schedule management application 9H (Step S302). As for the schedule, all the events recorded as today's schedule may be acquired or only events around the current time may be acquired.

Subsequently, the controller 10 performs determination of the moving state (Step S303). The controller 10 determines the moving state of the smartphone 1 based on the detection results of the acceleration sensor 15, the direction sensor 16, and the gyroscope 17. For example, the smartphone 1 determines whether the user is moving in a train, is moving on foot, or is moving in a car.

Subsequently, the controller 10 acquires the position information from the GPS receiver 18 (Step S304).

Subsequently, the controller 10 decides information to be displayed when returning from the sleep state to light up the display 2A again according to the moving state, the position information, and the schedule (Step S305).

Subsequently, the controller 10 determines whether to return from the sleep state (Step S306). For example, the controller 10 determines whether a double tap is detected via the touch screen 2B.

When a double tap is detected as a result of detection to return from the sleep state (Yes at Step S306), the controller 10 displays the information decided at Step S305 (information corresponding to the moving state, the position information, and the schedule) on the display 2A when returning from the sleep state to light up the display 2A again (Step S307), and ends the processing illustrated in FIG. 10.

Meanwhile, when it does not return from the sleep state because a double tap is not detected as a result of detection (No at Step S306), the controller 10 returns to the Step S303.

When it is not in the sleep state as a result of determination at the Step S301 (No at Step S301), the controller 10 ends the processing illustrated in FIG. 10.

In the embodiments, the smartphone 1 determines the moving state and decides the information to be displayed on the display 2A when returning from the sleep state to light up the display 2A again according to the moving state. Therefore, according to the embodiments, it is possible to provide as much useful information as possible to the user when the display is lit up again by its backlight.

In the embodiments, the smartphone 1 determines the moving state and decides the information to be displayed on the display 2A when returning from the sleep state to light up the display 2A again according to the moving state and the position information. Therefore, according to the embodiments, it is possible to provide useful and appropriate information to the user when the display is lit up again by its backlight.

In the embodiments, the smartphone 1 determines the moving state and decides the information to be displayed on the display 2A when returning from the sleep state to light up the display 2A again according to the moving state, the position information, and the schedule. Therefore, according to the embodiments, it is possible to provide useful and more appropriate information to the user when the display is lit up again by its backlight.

In the embodiments, the smartphone 1 repeatedly determines the moving state until it returns from the sleep state, and changes the information to be displayed on the display 2A. Therefore, according to the embodiments, it is possible to provide information corresponding to the moving state of the user as much as possible according to the moving state.

In the embodiments, the information to be displayed on the display 2A may be displayed in various modes such as an icon, a widget, or a link when returning from the sleep state to light up the display 2A again.

The embodiments have explained the example of returning from the sleep state in response to detection of the double tap, however, the display control (FIG. 8 to FIG. 10) is also applicable to a case of returning from the sleep state by performing an operation on a physical button such as the button 3.

The embodiments have explained the example of acquiring the position information based on the radio signal received by the GPS receiver 18, however, the position information may be acquired based on a spot of a wireless LAN (Local Area Network).

The embodiments have explained the smartphone as an example of the device according to the appended claims, however, the device according to the appended claims is not limited to the smartphone. The device according to the appended claims may be any device other than the smartphone if it is an electronic device such as a mobile phone and a tablet each of which is provided with a battery and a touch screen function.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
   a display configured to
      display information, and
      turn off in a sleep state; and
   a controller configured to
      determine a moving state during the sleep state,
      based on the moving state determined during the sleep state before the display is lit up, decide information to be displayed when the sleep state is released and the display is lit up,
      in response to detection of a first gesture during the sleep state, acquire the decided information to be displayed up to detection of a second gesture, without releasing the sleep state, and
      in response to the detection of the second gesture during the sleep state and after the detection of the first gesture, release the sleep state and display the acquired information on the display.

2. The mobile electronic device according to claim 1, further comprising:
   an acquiring module configured to acquire position information, wherein
   the controller is configured to decide, during the sleep state, the information to be displayed on the display based on the moving state and the position information acquired during the sleep state.

3. The mobile electronic device according to claim 1, wherein
   the controller is configured to decide, during the sleep state, the information to be displayed on the display based on transition of the moving state acquired during the sleep state.

4. The mobile electronic device according to claim 1, wherein
   in response to no detection of the second gesture during the sleep state and after the detection of the first gesture, the controller is configured to keep the sleep state and delete the acquired information.

5. The mobile electronic device according to claim 4, wherein
   the controller is configured to determine, still during the sleep state, the moving state once again after deleting the acquired information.

6. The mobile electronic device according to claim 5, wherein
   the controller is configured to start determining the moving state in response to transition to the sleep state.

7. The mobile electronic device according to claim 6, wherein
   the controller is configured to determine the moving state as at least one of
      a state in which a user carrying the mobile electronic device is moving on foot,
      a state in which the user is moving by a train, and
      a state in which the user is moving by a car.

8. The mobile electronic device according to claim 1, wherein
   the information to be displayed, which is decided during the sleep mode based on the moving state determined during the sleep state, was not displayed on the display before the mobile electronic device transited into the sleep state.

9. The mobile electronic device according to claim 8, wherein
   the moving state corresponds to a state in which a user carrying the mobile electronic device is moving by a train, and
   the information to be displayed, which was not displayed on the display before the mobile electronic device transited into the sleep state, includes information for guiding the user carrying the mobile electronic device when the user exits the train.

10. The mobile electronic device according to claim 8, wherein
   the information to be displayed, which was not displayed on the display before the mobile electronic device transited into the sleep state, includes a map of an area at a location corresponding to a scheduled event in the mobile electronic device.

11. The mobile electronic device according to claim 8, wherein
the information to be displayed, which was not displayed on the display before the mobile electronic device transited into the sleep state, includes information corresponding to a scheduled event in the mobile electronic device.

12. The mobile electronic device according to claim 8, wherein
the moving state corresponds to a state in which a user carrying the mobile electronic device is moving by a car, and
the information to be displayed, which was not displayed on the display before the mobile electronic device transited into the sleep state, includes traffic information related to the movement of the car.

13. The mobile electronic device according to claim 8, wherein
the information to be displayed, which was not displayed on the display before the mobile electronic device transited into the sleep state, includes at least one of
a map of an area at a current location of a user carrying the mobile electronic device,
weather information for the area at the current location of the user, and
calorie consumption by the user up to a current time.

14. A display control method executed by a mobile electronic device having a display which is turned off in a sleep state, the display control method comprising:
determining a moving state during the sleep state;
based on the moving state determined during the sleep state before the display is lit up, deciding information to be displayed when the sleep state is released and the display is lit up;
in response to detection of a first gesture during the sleep state, acquiring the decided information to be displayed up to detection of a second gesture, without releasing the sleep state; and
in response to the detection of the second gesture during the sleep state and after the detection of the first gesture, releasing the sleep state and displaying the acquired information on the display.

15. A non-transitory storage medium having a display control program for causing a mobile electronic device having a display, which is turned off in a sleep state, to execute:
determining a moving state during the sleep state;
based on the moving state determined during the sleep state before the display is lit up, deciding information to be displayed when the sleep state is released and the display is lit up;
in response to detection of a first gesture during the sleep state, acquiring the decided information to be displayed up to detection of a second gesture, without releasing the sleep state; and
in response to the detection of the second gesture during the sleep state and after the detection of the first gesture, releasing the sleep state and displaying the acquired information on the display.

* * * * *